United States Patent [19]
Knaust

[11] Patent Number: 6,038,856
[45] Date of Patent: Mar. 21, 2000

[54] GOVERNOR FOR AIR COMPRESSORS OF VEHICLES

[75] Inventor: Holger Knaust, Arnbach, Germany

[73] Assignee: Knorr-Bremse, Munich, Germany

[21] Appl. No.: 09/044,997

[22] Filed: Mar. 20, 1998

[30] Foreign Application Priority Data

Mar. 20, 1997 [DE] Germany .......................... 197 11 739

[51] Int. Cl.[7] .................................................. F16D 31/02
[52] U.S. Cl. .............................................. 60/410; 91/461
[58] Field of Search ........................... 60/407, 409, 410; 91/461

[56] References Cited

U.S. PATENT DOCUMENTS

| 3,924,408 | 12/1975 | Beiswenger et al. | 60/410 X |
| 3,934,413 | 1/1976 | Beiswenger et al. | 60/410 X |

FOREIGN PATENT DOCUMENTS 29 49 434   6/1981   Germany .

*Primary Examiner*—Hoang Nguyen
*Attorney, Agent, or Firm*—Evenson, McKeown, Lenahan & Edwards, P.L.L.C.

[57] ABSTRACT

A governor for air compressors of vehicles, that serves to control additional devices, especially energy-saving devices. From an inlet connection supplied from the compressed air supply, a pilot valve designed as a round slide valve with a small cross section is controlled. The pilot valve monitors the supply of compressed air to a switching piston for a double valve with a large cross section. The double valve is supplied with compressed air from the inlet connection and causes an outlet connection connected with the additional device to be charged with air or cut off from the air. The switching piston is connected with a valve tube of the round slide valve in such fashion that this valve, during switching processes, is moved in a direction opposite to that of regulating piston of the pilot valve, so that a precise switching of the governor that reflects the pressure differential is achieved at the upper and lower pressure limits. The governor permits rapid and complete switching of the additional devices, regardless of their compressed air requirements for switching and of any leaks.

10 Claims, 2 Drawing Sheets

GOVERNOR FOR AIR COMPRESSORS OF VEHICLES

BACKGROUND AND SUMMARY OF THE INVENTION

This application claims the priority of German patent document 197 11 739.2 filed Mar. 20, 1997, the disclosure of which is expressly incorporated by reference herein.

The invention relates to a governor for air compressors of vehicles, said compressors comprising at least one compressor, a compressed air storage tank that can be charged by the compressor, and an additional device that can be switched when a set pressure level is reached in the compressed air storage tank, especially for compressed air braking systems of road vehicles. An inlet connection is subjected to the pressure in the compressed air storage tank and a housing has an outlet connection that conducts an outlet pressure, with the outlet connection being connected with the additional device to switch it.

Governors of this kind, both when a lower pressure limit of the regulated pressure provided for the compressed air storage tank falls below atmospheric pressure and when an upper pressure level of the regulated pressure is exceeded, deliver an overpressure corresponding to the pressure in the tank at the outlet connection; this pressure at the outlet connection is used as a switching pressure for the additional device. The additional device can be a piston-controlled outlet valve for venting the air delivered by the compressor to atmosphere during compressor idle phases, an energy-saving device for the air compressor, for example a device to hold the compressor inlet valve open or a valve of a "damage area" regulator for the compressor that is separate and is installed in parallel with the compressor inlet valve, an intake throttle in the air intake manifold of the compressor, a shutoff clutch in the compressor rotary drive, an air drying device, especially a regeneration switching device therefor, or the like, individually or combined in a system.

Known governors have a regulating piston that is urged by a regulating spring against the pressure in a compressed air storage tank, said piston, when subjected to pressure that reaches a regulated pressure level, opening an inlet valve to connect the compressed air storage tank with the outlet connection, while when the piston is subjected to a lower pressure, it closes this valve and opens an outlet valve to connect the outlet connection with the atmosphere; the two valves are then combined into a double valve.

In this known governor design, the total quantity of air that the additional devices require for switching must flow through the valves that can be switched by the control piston, and therefore the valves must be designed with large cross sections, but this results in insensitive and inaccurate switching behavior; thus, only an unsatisfactory compromise involving rapid switching of the additional devices on the one hand and sufficient switching accuracy on the other hand can be achieved, with the variable quantity of compressed air required by the additional devices for switching possibly producing further undesired changes in switching behavior. As a result, an undetermined time-delayed switching behavior of the additional devices can result, with undesired or even inadmissibly excessive or reduced pressure in the compressed air supply tank. There is also the danger that the valves will be opened by the switching piston only gradually or only partially, which can result in incomplete switching of the additional devices, with correspondingly serious consequences: overloading or underloading of the compressed air supply tank; constant, unnecessary losses of compressed air and therefore of energy because exhaust valves are only partially open; failure of the air-drying devices to function; excessive wear and overheating of the shutoff clutch, and/or harmful vibration in the compressed air system or compressor drive.

Commonly assigned German patent application DE-A1-2949434 teaches a pressure regulator that is sold under the model designation DR 35 for air compressors for commercial vehicles. That pressure regulator acts on an outlet connection, said connection being maintained by an adjustable regulating spring against the pressure in an outlet connection possibly to be connected with a compressed air supply tank through an air dryer. The regulating piston is connected with a valve tube of a round slide valve, said valve, with predominant loading of the regulating piston by the pressure in the outlet connection, venting a loading chamber to atmosphere, and with insufficient loading, connecting the loading chamber with the outlet connection by shutting off this vent. The loading chamber is bounded by a switching piston, said piston, when the loading chamber is pressurized, opening to the atmosphere an otherwise closed outlet valve with a large cross section from an inlet connection connected with the compressor. The regulating piston with the slide valve and the switching piston with the outlet valve are mounted coaxially in a housing. The slide valve has a "dead stroke," causing it to acquire switching hysteresis so that it connects the loading chamber with the atmosphere on reaching an upper pressure limit for a regulated pressure level in the outlet connection, and connects it with the outlet connection when the regulated pressure level falls below a lower pressure limit.

An object of the invention is to design a governor in simple fashion such that regardless of the switching-air requirement of the additional device or devices, the latter is or are switched in a functionally reliable fashion, always exactly and completely, with the correct pressure level in the air compressor.

This and other objects have been achieved according to the present invention by providing a governor for a system including at least one compressor, a compressed air supply tank chargeable by the compressor, and an additional device that can be switched when a regulated pressure level is reached in the compressed air supply tank, comprising: a housing having an inlet connection communicating with the compressed air supply tank, and having an outlet connection communicated with the additional device; a pilot valve arranged in the housing; and a relay valve arranged in the housing, said relay valve having a cross section which is larger than a cross section of the pilot valve, said relay valve being pneumatically controlled by said pilot valve to set the outlet pressure at outlet connection when a pressure limit is exceeded in the inlet connection.

The present invention utilizes a pilot valve with a small cross section, located in the housing. This pilot valve, when a pressure limit is exceeded in the inlet connection, pneumatically controls a relay valve with a large cross section located in the housing to set the pressure at the outlet connection. Such governors can be used in air compressors, especially in conjunction with compressors and air dryers for commercial vehicles.

Other objects, advantages and novel features of the present invention will become apparent from the following detailed description of the invention when considered in conjunction with the accompanying drawings.

DETAILED DESCRIPTION OF THE DRAWINGS

Figure 1:
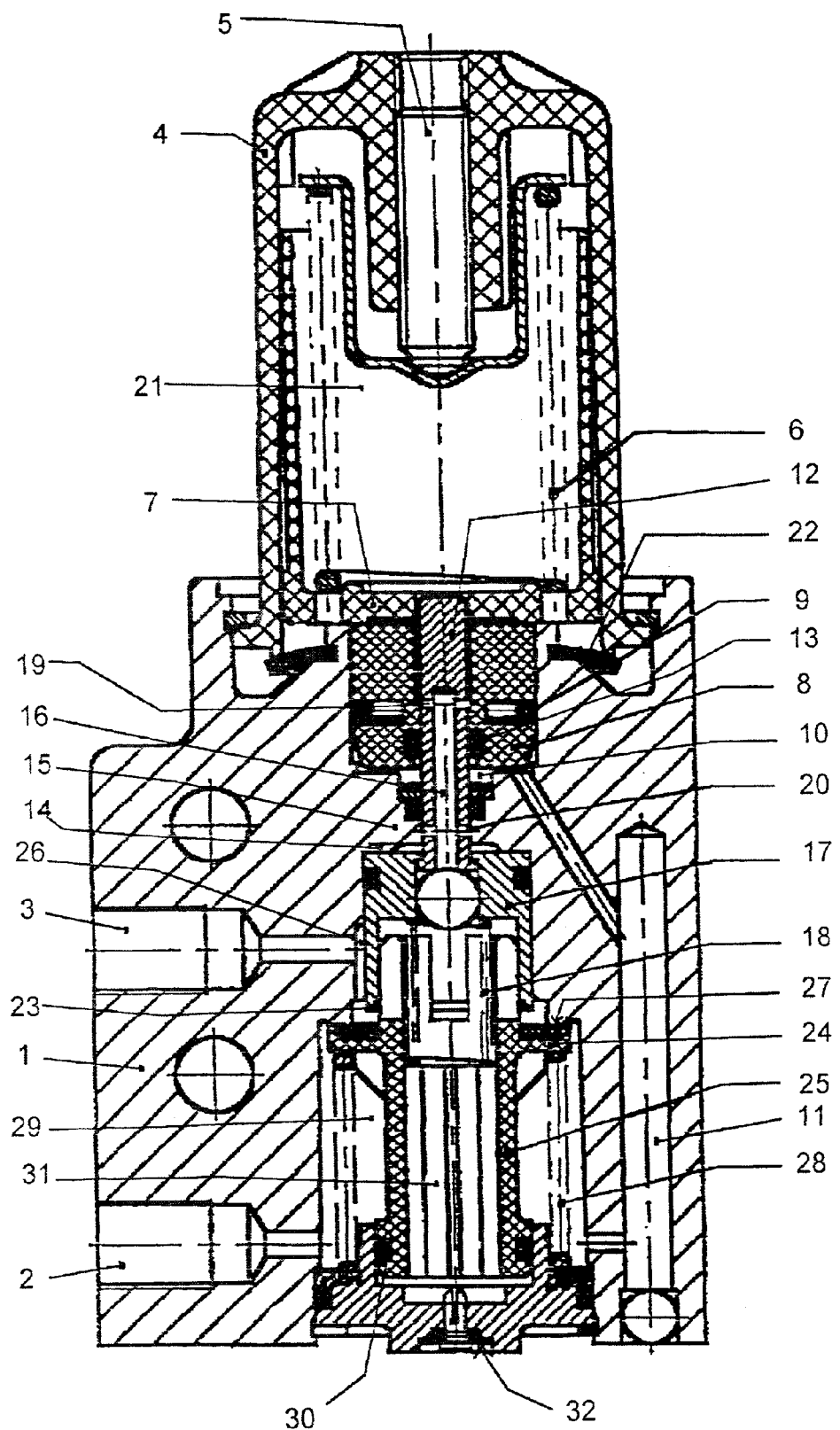
FIG. 1 is a section through the governor of a compressor according to a preferred embodiment of the present invention.

The governor that can be installed on the compressor according to FIG. 1 has a housing 1 with an inlet connection 2 and an outlet connection 3. At inlet connection 2, a compressed air supply tank that is not shown and is part of an air compressor and which can be charged by a compressor or the like, for example the compressor itself, can be connected. At outlet connection 3 an additional device, likewise not shown, for example of the type already mentioned above, especially with a switched input, can likewise be connected. A pot-shaped lid part 4 is mounted on housing 1, in which lid part a regulating spring 6 is located whose pretensioning can be adjusted by a screw connection 5.

Regulating spring 6 abuts a likewise pot-shaped spring plate 7 displaceably guided in lid part 4, said plate resting on a regulating piston 8 and being capable of being held on housing 1 in the loading direction of the regulating spring. Regulating piston 8 is displaceably sealed by means of a seal 9 in a matching bore of housing 1 and delimits a chamber 10 on the side facing away from the regulating spring, said chamber communicating via housing bores 11 with inlet connection 2. A valve tube 12 engages the central bores of regulating piston 8, designed as an annular piston, and of spring plate 7, in an axially displaceable manner, and there is a displaceably sealing O-ring seal 13 in an internal annular groove in regulating piston 8. Valve tube 12 passes through chamber 10 and displaceably seals a housing wall 15 that separates the chamber 10 from a loading chamber 14 and is connected, with sealing of its inner chamber 16, by a switching piston 17 that delimits loading chamber 14 from housing wall 15. At a certain distance below switching piston 17 there is a stop that is not described in greater detail and which delimits the downward movement of switching piston 17. A spring 18 urges switching piston 17 in the direction of loading chamber 14. In interior 16 of valve tube 12, two cross bores 19 and 20 terminate that are axially offset with respect to one another, with cross bore 19 being wiped (i.e., sealed) by O-ring seal 13, depending on the stroke position of switching piston 17 and regulating piston 8, in a manner to be described in greater detail below, above or below O-ring seal 13, in other words in chamber 21 that receives regulating spring 6 or in chamber 10, and its other cross bore 20 terminates permanently in loading chamber 14. By means of cross bore 19, therefore, valve tube 12 forms a round slide valve 12 with O-ring seal 13, which in turn forms a pilot valve together with regulating piston 8 and regulating spring 6.

Chamber 21 communicates through an annular membrane 22 that acts as a check valve and prevents the penetration of contaminants, is secured at its inner edge on housing 1, and is communicated with the atmosphere through the non-airtight mounting of lid part 4 on housing 1.

Switching piston 17 is made in the shape of a pot on its side facing away from loading chamber 14 and terminates in an annular valve seat 23 opposite a double valve seal 24 mounted on tubular body 25. Chamber 26 outside valve seat 23 communicates with outlet connection 3. Double valve seal 24 is located axially opposing a valve seat 27 integral with the housing and located radially outside valve seat 23. A spring 28 located in chamber 29 surrounding valve seat 23 urges double valve seal 24 in the direction of valve seats 23 and 27. The two valve seats 27 and 23 as well as double valve seal 24 therefore constitute valve parts of a double valve 23, 24, 27, whose throughflow cross section is much greater than that of round disk valve 12, 13 described above. Spring 28 is located in chamber 29 that also surrounds tubular body 25, said chamber being connected with inlet connection 2. At the end facing away from double valve seal 24, tubular body 25 has a piston-like seal 30 with respect to housing 1, whose diameter roughly corresponds to that of valve seat 23 and which thus serves for pneumatically relieving double valve 23, 24, 27. Double valve 23, 24, 27 together with switching piston 17 forms a relay valve. The interior 31 of tubular body 25 is connected with the chamber surrounded by valve seat 23 and also with the atmosphere through a membrane vent valve 32.

With zero pressure, or with a pressure that is below a lower pressure limit, of the regulated pressure level at inlet connection 2, the parts of the governor assume the positions shown in the drawing: double valve seal 24 abuts valve seat 27, urged by spring 28, and spring 18 holds switching piston 17 in its upper position, while the regulating spring holds regulating piston 8 in its lower position in which it is secured to housing 1. Loading chamber 14 is then vented through cross bore 20, interior chamber 16, cross bore 19 which is located a certain distance above O-ring seal 13, chamber 21, and annular membrane 22. The specific distance is larger than the above-mentioned distance of switching piston 17 from the stop located below it. The outlet connection 3 is likewise vented to atmosphere through chamber 26, the open annular gap between valve seat 23 and double valve seal 24, chamber 31, and membrane vent valve 32. The pressure applied to the inlet connection prevails in chamber 29 and through bores 11 in chamber 10.

The atmospheric pressure applied to outlet connection 3 holds the additional device in the associated switched position, for example it switches the compressor to supply compressed air, causing the pressure at inlet connection 2 to rise. As soon as the pressure at inlet connection 2 exceeds an upper pressure limit for the regulated pressure that differs by a specific amount from the above-mentioned lower pressure limit, the pressure prevailing in chamber 10 is sufficient to lift the regulating piston against the tension of regulating spring 6 so that O-ring seal 13 wipes or seals cross bore 19. Loading chamber 14 is then cut off from venting to atmosphere and is likewise subjected to the pressure of input connection 2 that prevails in chamber 10, so that switching piston 17 moves downward, setting valve seat 23 on double valve seal 24 and taking it with it as it is lowered from valve seat 27. The above-mentioned stop, which is not described in greater detail, thus limits the downward movement of switching piston 17. Switching piston 17 takes valve tube 12 down with it, so that the vertical spacing between O-ring seal 13 and cross bore 19 located below it increases, resulting in a "dead stroke" to return slide valve 12, 13. Switching double valve 23,24, 27 cuts off chamber 26 and outlet connection 3 from membrane vent valve 32 and subjects both to pressure, especially outlet connection 3, through a large throughflow cross section from chamber 29 and input connection 2. In outlet connection 3, therefore, even with relatively high compressed air consumption at the latter, which can be caused for example by a control line that draws air in a large quantity and for a prolonged period of time and/or by a connected additional device with a high compressed air requirement for switching, a rapid and powerful pressure increase up to an upper pressure limit occurs, so that the additional device switches quickly and completely. According to the selected example, the additional device, as it is switched, cuts off the compressed air supply from the compressor in a suitable fashion, with maximum energy savings, so that the pressure at inlet connection 2 no longer rises but instead drops as a result of the consumption of compressed air by other devices.

As soon as the pressure prevailing at the inlet connection drops below the lower limit of the regulated pressure, regulating piston 8 is moved downward by the force of regulating spring 6 until O-ring seal 13 again wipes or seals cross bore 19 as it goes down, so that in a reversal of the process described above, loading chamber 14 is cut off from inlet connection 2 and vented to atmosphere. Since cross bore 19 is located further down because of the above-mentioned "dead stroke" than in the upwardly directed wiping process described above, the pressure below regulating piston 8 during this downwardly directed wiping process is lower by a corresponding pressure differential than during the wiping process described above. The pressure that still prevails at the inlet connection below switching piston 17, reinforced by the force of spring 18, lifts switching piston into the position shown, whereupon double valve seal 24 follows up to the stop on valve seat 27 under the force of spring 28, and thus lifts valve seat 23 from it. Chamber 26 and outlet connection 3 are then cut off from inlet connection 2 and vented to atmosphere through membrane vent valve 32 with a large cross section, so that a rapid and complete pressure drop takes place in outlet connection 3 and at the control inlet of the additional device connected therewith, said pressure drop causing the additional device to reset rapidly and completely, for delivering compressed air from the compressor for example.

It is advantageous for the manufacturing and space requirements of the governor for it to be designed with one axis if possible. Thus, regulating piston 8 with round slide valve 12, 13, switching piston 17, and double valve 23, 24, 27 as well as springs 18 and 28 are located coaxially in housing 1.

It should be emphasized that round slide valve 12, 13 can have a small cross section and be relieved largely pneumatically so that it can be easily switched by regulating piston 8, so that it switches very precisely at the above-mentioned pressures. These pressures can be adjusted by using screw 5 to adjust the pretension of regulating spring 6. Round slide valve 12, 13 together with regulating piston 8 constitutes the precisely working pilot valve already mentioned which controls the likewise already mentioned relay valve that comprises switching piston 17, and double valve 23, 24, 27 that can be switched by the latter. By setting the dimensions of the spaces between cross bore 19 and O-ring seal 13 and switching piston 17 with respect to its stop with the governor at zero pressure, the switching hysteresis between the upper and lower regulated pressure limits is determined, in other words, the switching on and off of the additional device, which is maintained exactly. As a result, unacceptable frequent switching is avoided. Double valve 23, 24, 27 which has a large cross section ensures rapid and complete switching of the additional device D, regardless of the compressed air required for the purpose, without adversely affecting the switching accuracy of the governor. In addition, double valve 23, 24, 27 continues to supply air, and if compressed air is lost at outlet connection 3 as a result of leaks in the additional device that is connected or in the control line to the latter, the pressure is maintained without reduction by adding compressed air from inlet connection 2.

Of course it is possible to connect several additional devices to outlet connection 3 instead of one, for example those of the type mentioned at the outset. In addition, structural modifications of the governor are possible, for example round slide valve 12, 13 can be replaced by a valve of another design, for example a "stroke double valve" with a small cross section. Conversely, double valve 23, 24, 27 can be replaced by a slide valve or another valve design. In addition, the arrangements of the valve seats and the valve seals of the double valve can be exchanged, so that valve seals replace valve seats 23 and 27. Spring 18 in the embodiment is made much weaker than spring 28, and these springs can also be designed differently and can be arranged in series or in parallel relative to switching piston 17. In the embodiment, switching piston 17 is coupled mechanically by valve tube 12 which in turn is mechanically connected with the pilot valve that incorporates round slide valve 12, 13; however, a pneumatic coupling can also be provided instead of this mechanical coupling.

Figure 2:
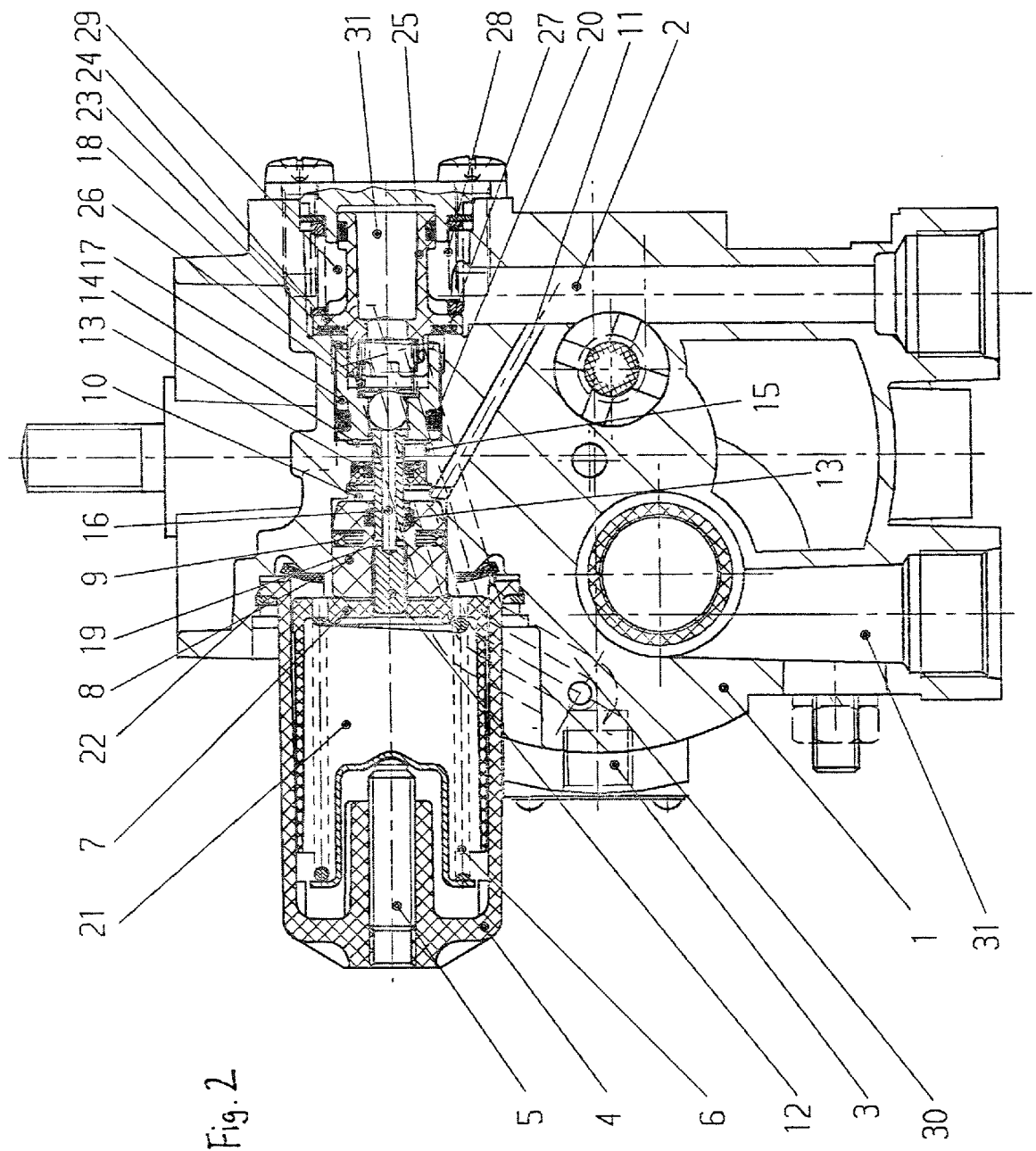
FIG. 2 is a section through the governor of an air dryer.

Finally, the governor can be combined structurally with other devices or integrated with them. Thus for example FIG. 2 shows a governor integrated into housing 1 of an air dryer. In terms of its function and basic design, it corresponds to the governor described above for a compressor. Inlet connection 2 of the governor constitutes one outlet of the air dryer. Another difference is that chamber 26 is connected by a manifold 30 with outlet connection 3. For venting, chamber 21 is permanently connected with the atmosphere.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Governor for at least one compressor, a compressed air supply tank that can be charged by the compressor, and an air compressor for motor vehicles that has an additional device that can be switched when a regulated pressure level is reached in the compressed air supply tank, comprising:

a housing having an inlet connection that can be subjected to the pressure in the compressed air supply tank, said housing having an outlet connection that conducts outlet pressure, said outlet connection being connected with the additional device to switch the additional device, a pilot valve with a relatively small cross section located in said housing, said pilot valve, when a pressure limit is exceeded in said inlet connection, pneumatically controlling a relay valve with a relatively large cross section located in the housing, to set the outlet pressure at said outlet connection.

2. Governor according to claim 1, further comprising a regulating piston located in said housing and associated with said pilot valve, said regulating piston being urged by the pressure in said inlet connection against the force of a regulating spring and being coupled with a switching member of a slide valve that has first and second switching positions therebetween, with said slide valve, when in said first switching position that is set by the pressure in said inlet connection under the predominant loading of said regulating piston, connecting a loading chamber for a switching piston located in said housing and associated with said relay valve with said inlet connection, and into the second switching position, shutting off said inlet connection, communicating with the atmosphere, with said switching piston switching a double valve, which, with atmospheric pressure in said loading chamber, connects said outlet connection of said housing with the atmosphere, and with said loading chamber subjected to compressed air, with the atmospheric connection shut off, with said inlet connection, with said double valve having a larger throughput cross section than said slide valve.

3. Governor according to claim 2, wherein said regulating piston and said switching piston are arranged coaxially with one another in said housing, with said regulating spring, located in a chamber that is subjected to atmospheric pressure, being located on the side of said regulating piston that faces away from said switching piston and said loading chamber and bordering the side of said switching piston that faces said regulating piston, and wherein said switching piston is coupled with a second switching member that, together with the first switching member, forms said slide valve.

4. Governor according to claim 3, wherein said slide valve is designed as a round slide valve, with said switching piston being coupled on the side of regulating piston with a valve tube, said valve tube passing through said loading chamber and having inside said loading chamber, a cross bore that communicates with an interior chamber, passes displaceably with a sealing action through a housing wall that separates said loading chamber from a chamber, and that is subjected to the pressure in said inlet connection and is delimited by said regulating piston, and engages a central bore of said regulating piston formed as an annular piston, with said regulating piston having in said central bore, a seal that seals it off from the valve tube, and the valve tube in the vicinity of said regulating piston having a second cross bore that communicates with said interior chamber, said second cross bore being wiped by the seal.

5. Governor according to claim 4, wherein said switching piston, in a chamber located facing away from the regulating piston and connected with outlet connection, has a first valve part of said double valve designed as a seat valve, said double valve being surrounded at a distance by a second housing-integral valve part of said double valve, and further comprising a third annular valve part that cooperates with said first and second valve parts and faces away from the switching piston, and is urged in the direction of the first and second valve parts by a spring, and which is located in a chamber that faces away from the switching piston and is connected with said inlet connection, is displaceably sealed with respect to said housing, and is coaxial with switching piston (17), with the interior of said body communicating with the atmosphere and having a sealing diameter with respect to said housing roughly corresponding to the diameter of the first valve part.

6. Governor according to claim 5, wherein said first and second valve parts are designed as valve seats and said third valve part is designed as a double valve seal.

7. Governor according to claim 3, wherein said switching piston is urged by a spring and faces away from the loading chamber.

8. Governor according to claim 4, wherein said switching piston is urged by a spring and faces away from the loading chamber.

9. Governor according to claim 5, wherein said switching piston is urged by a spring and faces away from the loading chamber.

10. Governor according to claim 1, wherein said governor is used in a compressed air braking system of a road vehicle.

\* \* \* \* \*